United States Patent [19]
Holmes

[11] Patent Number: 5,893,468
[45] Date of Patent: Apr. 13, 1999

[54] STORAGE RACK SYSTEM

[76] Inventor: Earl E. Holmes, 105 Belmont Ave., Clarks Green, Pa. 18411

[21] Appl. No.: 08/814,925

[22] Filed: Feb. 28, 1997

[51] Int. Cl.⁶ .................................................. A47F 5/00
[52] U.S. Cl. ........................ 211/60.1; 211/151; 414/267
[58] Field of Search ................................ 211/60.1, 151, 211/162, 175, 70.4; 414/267, 281

[56] References Cited

U.S. PATENT DOCUMENTS

| | | |
|---|---|---|
| 561,715 | 6/1896 | Lynch . |
| 1,393,054 | 10/1921 | Turner . |
| 1,561,844 | 11/1925 | Gipson . |
| 2,769,559 | 11/1956 | Johnson ........................... 211/151 X |
| 2,801,752 | 8/1957 | Jakubowski . |
| 2,992,802 | 7/1961 | Spillios . |
| 3,021,011 | 2/1962 | Visneski . |
| 3,157,424 | 11/1964 | Hall . |
| 3,400,828 | 9/1968 | May . |
| 3,465,897 | 9/1969 | Schumann et al. ............... 211/151 |
| 3,503,519 | 3/1970 | Jay . |
| 3,708,074 | 1/1973 | Fahey et al. ...................... 211/151 X |
| 3,945,497 | 3/1976 | Greenberg . |
| 4,116,343 | 9/1978 | Hall ................................... 211/151 |
| 4,223,792 | 9/1980 | Aspen ................................ 211/162 |
| 4,403,698 | 9/1983 | Care et al. . |
| 5,595,311 | 1/1997 | Allen . |

*Primary Examiner*—Robert W. Gibson, Jr.
*Attorney, Agent, or Firm*—Synnestvedt & Lechner

[57] ABSTRACT

Apparatus comprising a plurality of mobile carriages arranged in a closely spaced row for storing, organizing and displaying a multiplicity of elongated items arranged in a plurality of groups according to a physical characteristic of the elongated items is disclosed. An associated method for loading empty carriages or replenishing depleted carriages is also disclosed comprising the steps of removing a carriage from the row, loading the carriage with items and replacing the carriage into the row. Carriages comprise a rectangular frame having vertically extending posts providing an open construction to allow replenishing and dispensing of items. Carriages have wheel pairs at one end and are guided in their movement into and out of the row by rails arranged beneath each carriage.

33 Claims, 6 Drawing Sheets

| # STORAGE RACK SYSTEM

FIELD OF THE INVENTION

This invention relates to an apparatus for conveniently storing, organizing and displaying elongated items according to a physical characteristic of the items and also to a method for storing, displaying, dispensing and replenishing the elongated items using the apparatus.

BACKGROUND OF THE INVENTION

Elongated items such as lumber products, pipe, conduit, standard metal stock and the like present a special set of problems in the organization, storage and display of such items. Businesses which handle such items, such as lumber yards, building supply outlets and warehouses find it desirable to organize the items in a logical scheme based upon a physical characteristic of the items which allows for orderly and efficient inventorying, management and supply of the items to their customers. For example, pvc pipe stock could be organized in different groups according to pipe diameter. There are at least 6 different standard pvc pipe diameters commonly available. Customers or warehousemen desiring pipe of a specified diameter could easily find exactly what they need from among a large volume of pipe stock if the stock is conveniently organized into groups by the pipe diameter. Pipe stock could also be organized according to length, there being two standard lengths, 10' and 20', available. Similarly, lumber could be organized by its characteristic dimensions (2×4, 4×4, etc.) or by the type of wood (pine, maple, oak, mahogany).

Organization of the items is only part of the problem however. Elongated items, as described above, are bulky and difficult to store. For example, pipe stock is not inherently stackable for neat and compact storage. If not supported by a rack of some kind, pipe stock will tend to roll and seek ground, creating a jumble of piping which needs constant attention. In a self-service retail store, such as a building supply outlet, where customers themselves draw the items from store stock directly, the orderly display of the items is important to promote sales, allow easy and convenient customer access and to ensure the safety of customers.

In addition to the problems of storage outlined above, it is also inherently difficult to handle bulky elongated items to replenish depleted stock. Stacking the items either in a rack or a self-contained pile is typically done by hand one piece at a time, thus proving to be an expensive, labor intensive effort. During this process the items run an increased risk of breakage or other damage occurring.

Figure 7:
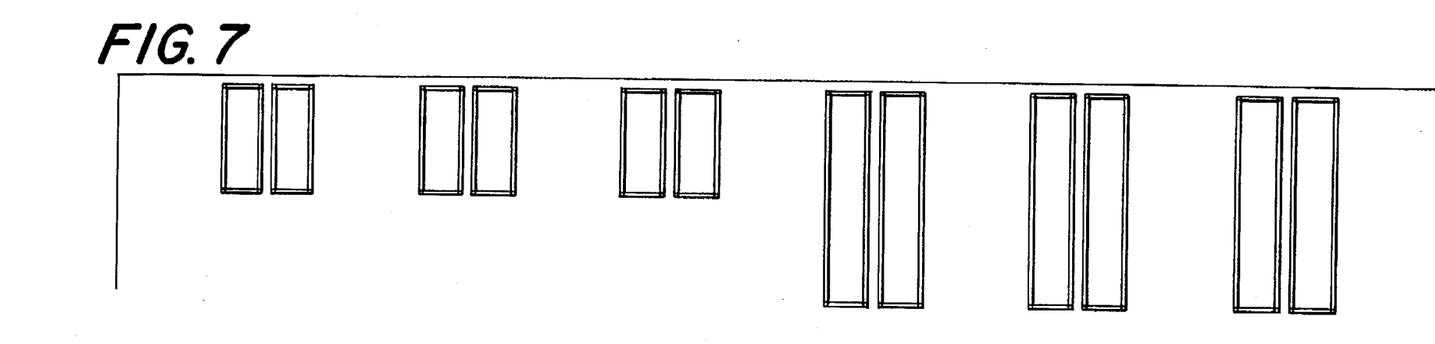
FIG. 7 shows a plan view of a prior art system for storing a multiplicity of elongated items in racks in a store or yard.

Some lumber yards or building supply outlets use forklifts or tow motors to handle elongated items in bulk which are "palletized" or otherwise temporarily banded together when delivered to the yard. An employee removes the pallet of pipe or lumber (for example) from the delivery truck via a forklift or tow motor and then brings the pallet to the storage rack and places the entire pallet into the rack. The employee then cuts the bands holding the items, which are supported on the rack for display and dispensing to customers. The problem inherent in this system is that the racks must be spread out over a relatively large area of the yard or store, as seen in FIG. 7. Sufficient space must be provided between the racks, typically on the order of 10' or more, to allow room for the forklift to maneuver between the racks to replenish depleted racks with the elongated items. The simple 12 rack system shown in FIG. 7 occupies 124 linear feet and requires approximately 2660 square feet of floor space to display a plurality of ten and twenty foot long items arranged in 12 categories. Much of the area is wasted dead space, unusable to display more items or other store wares.

SUMMARY OF THE OBJECTS OF THE INVENTION

The invention comprises an apparatus and a method for storing and displaying a multiplicity of elongated items arranged in a plurality of categories, the categories corresponding to a particular physical characteristic of the items. The apparatus and method of the invention also provide a means for easily and conveniently dispensing the items to customers and replenishing depleted items with minimum effort and risk of damage.

The apparatus comprises a plurality of mobile carriages arranged side by side in a closely spaced row. Each carriage is adapted to receive elongated items of one particular category corresponding to a predetermined physical characteristic of the items.

In its preferred form, a carriage comprises a rack formed by two horizontal end beams arranged in a parallel, spaced apart configuration, one beam being positioned at each end of the carriage. Two side beams are arranged longitudinally along the sides of the carriage and are rigidly connected between the end beams forming a rectangular frame. Preferably, four posts extend upwardly from the frame, the posts being attached to the side beams, the posts spaced apart, preferably one in each corner of the frame. Two transverse support beams are attached between the posts, one at each end of the frame, arranged parallel to and above each end beam. This construction provides the carriage with open sides and ends which provide ready access to the rack for dispensing and replenishing elongated items stored on the rack.

The carriage is supported at one end by a pair of spaced apart supports projecting downwardly from the frame, the supports having wheels or skids distally mounted to provide mobility to the carriage. A second pair of supports is also attached to the frame and projects downwardly, the second pair being spaced apart from the first set and attached to the side beams. Although the second pair of supports could also mount wheels or skids, it is preferred that the second pair of supports not have a means of mobility, this being confined to the first support pair.

The transverse support beams serve as receiving means for the elongated items. Elongated items from a particular predetermined category are positioned lengthwise on the frame substantially perpendicularly to the transverse support beams, the vertically projecting posts preventing any tendency for lateral motion of the items, as would occur with round pipe, for example. The transverse support beams are adapted to support the elongated items corresponding to a particular category as, for example, by spacing the transverse support beams apart a predetermined distance in proportion to the length of the particular elongated items. Spacing the transverse support beams above the end beams allows the carriage to be conveniently loaded from the side with elongated items by a forklift. The transverse support beams support the elongated items above the frame, allowing space between the items and the frame for the forklift tines to be lowered and disengaged from the items without contacting the side beams.

The amount of items stackable on the carriage is limited by the height of the upwardly extending posts. Provision to augment the carrying capacity of a carriage is provided by post extenders which mount on the posts and extend further upwardly to allow more items to be stored on the rack.

Preferably, the posts are tubular and the post extenders telescopically interfit within the posts. The extenders are fixed in position relatively to the posts by a locking means in the form of a stop plate which is attached to the extender at a predetermined location along the extender's length. The stop plate impinges on the post when the extender is telescopically interengaged within the post and locks the extender into position.

Although wheels or skids are mounted on the carriage to provide mobility, the surface on which the carriage is positioned may not be conducive to ready mobility of the carriage. For example, if the carriage is used in an outdoor lumberyard having a gravel bed surface, wheels or skids may have difficulty moving easily over the gravel. To avoid such problems a pair of rails is positioned beneath the carriage in a spaced apart arrangement corresponding to the wheels or skids. Each rail preferably has a continuous horizontal and vertical leg engaging the wheels, the horizontal leg providing a smooth sliding or rolling surface and the vertical leg providing a guiding function, keeping the moving carriage along a predetermined path defined by the rails. A diagonal brace is used when necessary to avoid skewing of the rail pair. The brace is fixed diagonally between opposite ends of the rail pair and absorbs shearing forces, as is well known in the structural arts. Cross ties are also mounted at each end of the rails to further rigidize the construction and provide a stop against excess motion of a carriage.

Movement of the carriage is generally effected by a forklift or other type of tow motor. The tines of the forklift engage the carriage end opposite the wheels or skids, raise the supports at that end above the ground and then draw the carriage along the path defined by the rails. It is preferable to equip the carriage with a means for engaging the tines, and a flanged lifting beam is provided for this purpose. The lifting beam comprises a cross beam mounted to the side beams adjacent to the end of the carriage opposite to the wheels and has a downwardly projecting flange. The lifting beam engages the tines and distributes the lifting and traction of the forklift forces to the side beams of the frame. The downwardly projecting flange acts as a spacing guide to prevent the forklift from contacting the ends of elongated items which can sometimes extend outwardly from the end of the carriage. The flange is positioned to engage the tip of each forklift tine when the tines are correctly positioned beneath the lifting beam and prevent the tines from moving further inwardly relatively to the carriage.

The method of the invention comprises arranging a plurality of carriages, as described above, in a closely spaced row with a respective predetermined path arranged below each carriage substantially perpendicularly to the row. Each path engages the means for moving a respective carriage, guiding the carriage along the path. The path is preferably formed by a respective rail pair arranged beneath each carriage.

Empty carriages are initially loaded with elongated items by first moving an empty carriage on its moving means (wheels or skids for example) outwardly from the row along the path beneath the carriage. In practice, this is done by engaging tines of a forklift with a lifting beam arranged at the end opposite to the wheels or other moving means, elevating the engaged end of the carriage to raise the non-wheeled support pair above the ground and then drawing the carriage outwardly from the row by reversing the forklift. Removing the carriage from the row exposes the open sides of the carriage for convenient access. The carriage end is lowered and the forklift is disengaged from the carriage and used to fetch a bound load of elongated items of a particular category. In the next step, items are placed onto the carriage from one open side. This is done by the loaded forklift approaching the removed carriage from an exposed side, the forklift then placing the load on the carriage. The carriage is then replaced into the row by moving the carriage in an opposite direction along the path. Again, the forklift returns to the carriage end, engages and lifts the carriage end and replaces the carriage into the row by moving the carriage back along the path. This process is repeated for each carriage requiring loading. Each carriage will preferably hold a different category of elongated item organized according to a physical characteristic of the item and individual to that carriage.

Items held on the carriages are manually dispensed from the carriages to customers through the open ends of the carriages. As carriages become depleted of stock, the depleted carriage is removed from the row and replenished with stock by essentially the same procedure of removing the depleted carriage from the row, placing elongated items onto the carriage and replacing the now full carriage back into the row as described above.

It is an object of this invention to provide an apparatus for organizing elongated items according to a physical characteristic of the items.

It is also and object of the invention to provide a means for safely and conveniently displaying and storing elongated items in a compact space.

It is a further object of the invention to provide an efficient means of handling and replenishing elongated items which minimizes the labor required.

It is yet another object of the invention to provide a means of handling and replenishing elongated items which minimizes the risk of breakage or damage to the items.

These and other objects will become apparent from a consideration of the following drawings and detailed description of the invention.

DETAILED DESCRIPTION OF THE INVENTION

Figure 8:
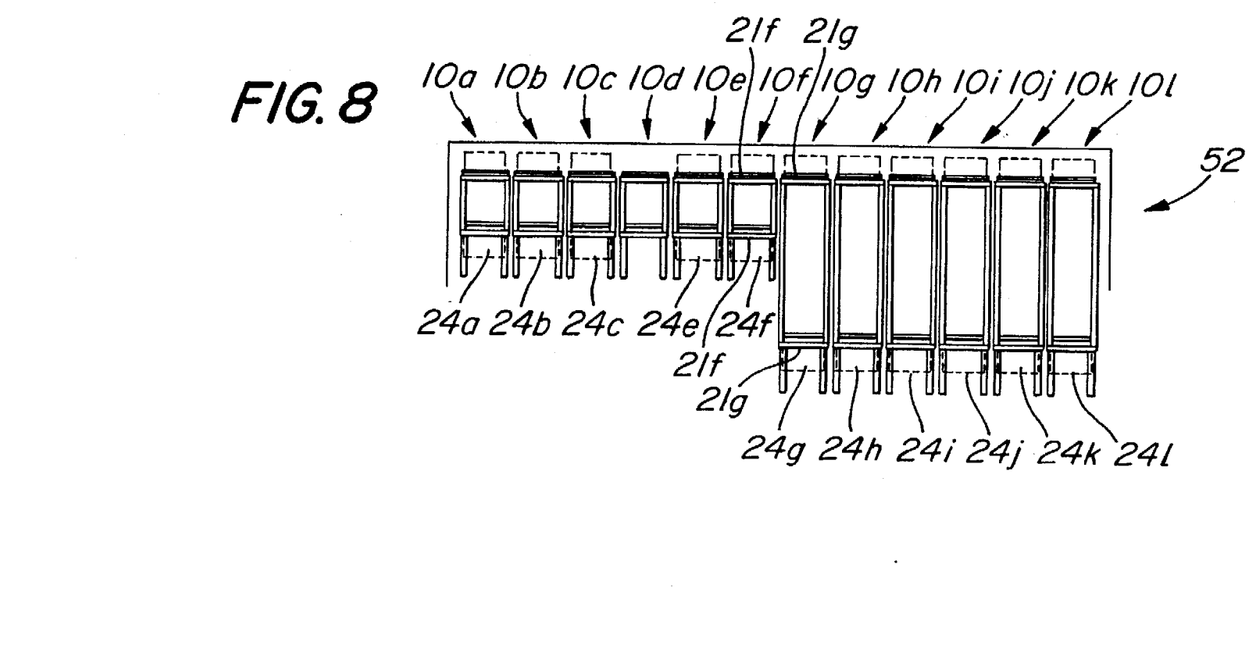
FIG. 8 shows a plan view of an apparatus according to the invention for storing and displaying a multiplicity of elongated items in a plurality of categories organized according to one or more physical characteristics of the elongated items.

The apparatus according to the invention is shown in plan view in FIG. 8 and comprises a plurality of carriages arranged side by side in a closely spaced row for organizing, storing and displaying a multiplicity of elongated items in a plurality of categories defined by one or more physical characteristics of the elongated items.

Figure 1:
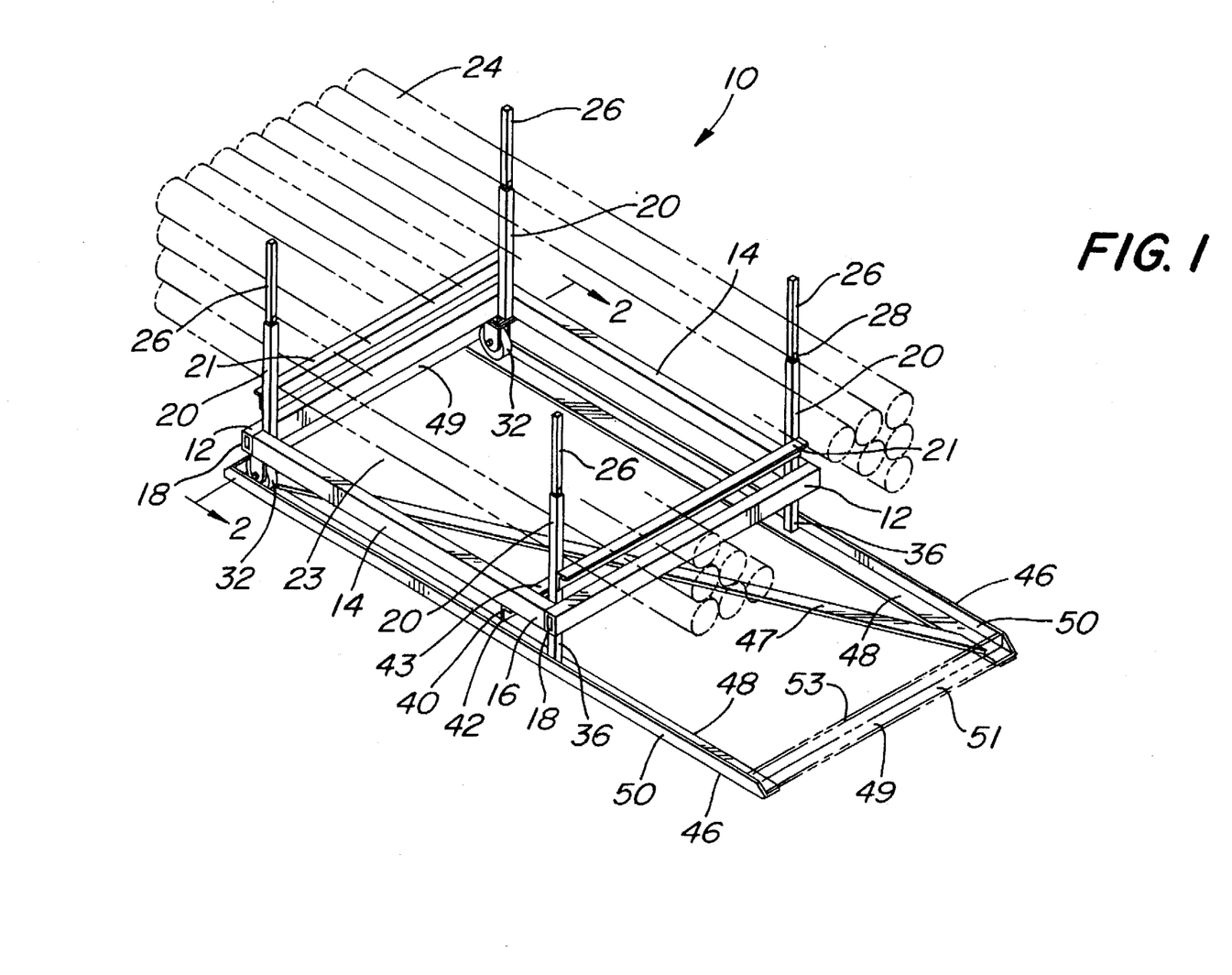
FIG. 1 shows an isometric view of a carriage according to the invention with elongated items shown in phantom line.

FIG. 1 depicts the preferred embodiment of a typical carriage 10. Carriage 10 has end beams 12 arranged in a parallel, spaced apart relationship at either end of the carriage. Side beams 14 are rigidly connected to end beams 12 along the side edges of carriage 10 forming a rectangular frame 16. End beams 12 and side beams 14 can have virtually any cross a sectional shape, but the box beam section 18, shown in FIG. 1, is preferred because of its structural characteristics, common availability as a standard section and its relative low cost. The box beam section is an efficient section providing a high stiffness to weight ratio due to its shape. Being a closed section, box beam section 18 is torsionally rigid, and its simple shape further allows for easy attachment of end beams 12 to side beams 14 by welding or bolting without the need for special clips or fittings. Beams 12 and 14 are preferably made of relatively high strength, durable materials, such as aluminum or steel alloys.

Figure 5:
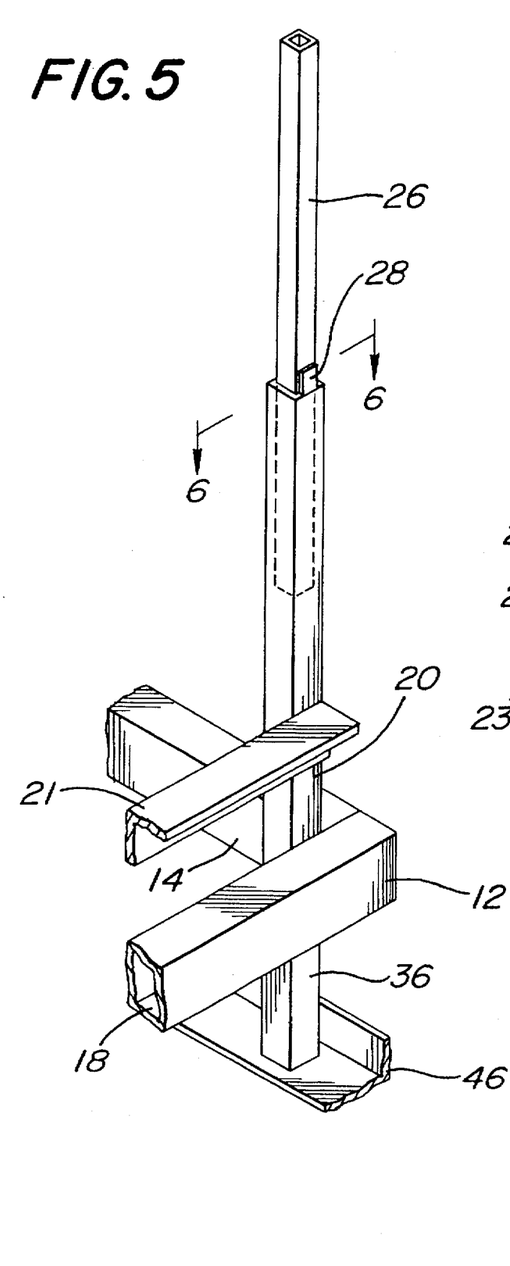
FIG. 5 is a detailed isometric view of an upwardly extending post with an extender mounted telescopically within the post and a stop plate impinging on the post.
Figure 6:
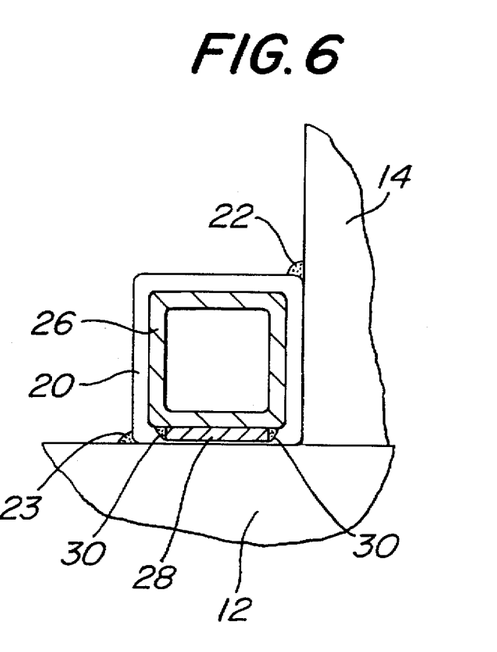
FIG. 6 shows a cross sectional view of a post, extender and stop plate taken along line 6—6 of FIG. 5.

Vertical posts 20 extend upwardly from frame 16 as shown in FIG. 1 and in detail in FIGS. 5 and 6. Posts 20 are attached to side beams 14, typically by respective fillet welds as seen at 22 in FIG. 6, the posts being spaced apart from each other. Ideally posts 20 are positioned in the corners of frame 16 as shown to maximize the distance over which the posts support elongated items 24, thus preventing lateral motion of the items and retaining them on the carriage 10, as illustrated in FIG. 1. Mounting the posts 20 in the corners also provides for a greater surface area over which to attach them to frame 16, it being possible to weld to both side beam 14 and end beam 12 as seen in FIG. 6 at 22 and 23. Posts 20 are preferably mounted inboard of frame 16 as seen in FIGS. 1, 5 and 6 to permit the carriages to be as closely spaced together as possible when arranged side by side in a row according to the invention.

Figure 2:
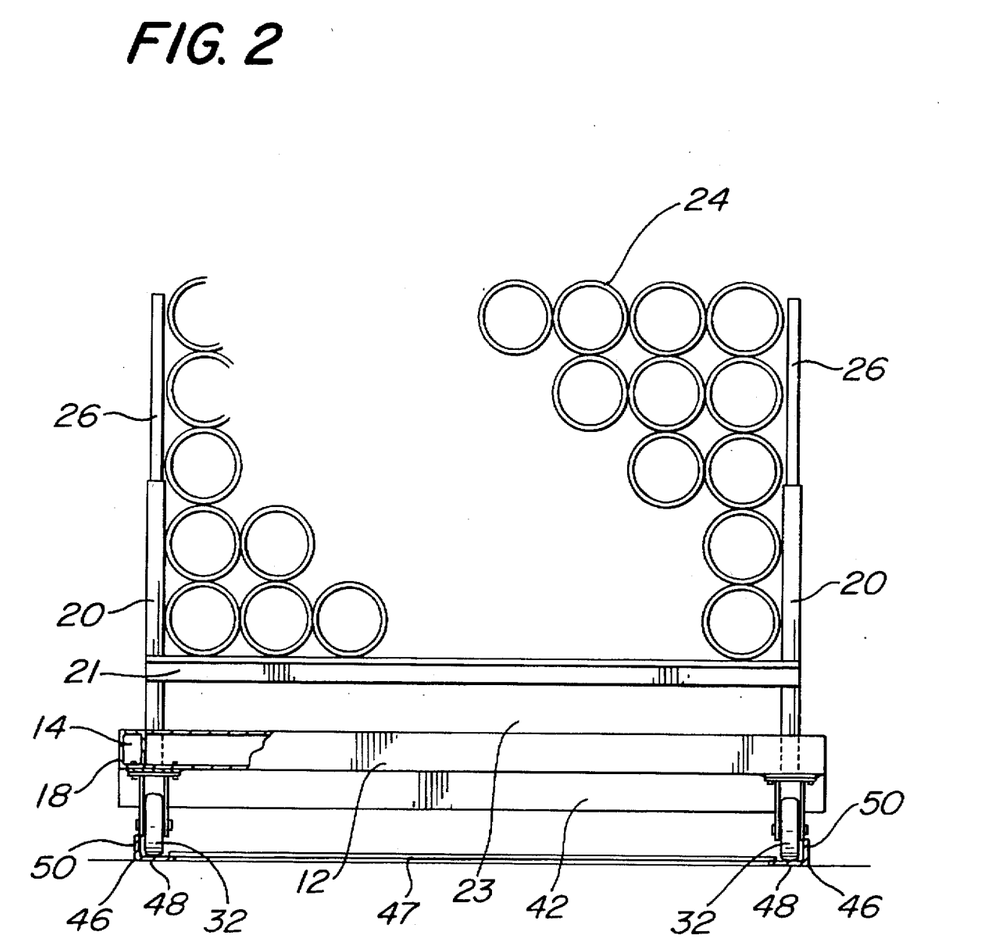
FIG. 2 shows an end sectional view of the carriage taken along line 2—2 of FIG. 1.

FIGS. 1 and 2 show that the height of posts 20 can limit the item carrying capacity of carriage 10. For example, elongated items 24 stacked above the level of posts 20 will roll off of carriage 10. Thus post extenders 26 are provided which mount to posts 20 and extend upward, increasing the length of the posts and thereby augmenting the carrying capacity of carriage 10. Posts 20 are tubular in cross section as seen in FIGS. 5 and 6 which allows extenders 26 to conveniently telescope as required without the need for special mounting fittings or tools to attach the extenders 26. A stop plate 28 is attached to the extender 26 at a predetermined position along the length of the extender. Stop plate 28 is welded to extender 26 by fillet welds 30 as seen in FIG. 6. Stop plate 28 impinges on post 26 and provides a locking means to fix the position of extender 26 relatively to post 20. Stop plate 28 is attached at a predetermined position along extender 26 to provide a practical extension length to post 20 while providing sufficient length telescopically engaging post 20 to reliably support elongated items 24 laterally without pulling out of the post under lateral loading.

As seen in FIGS. 1 and 2 and in detail in FIG. 5, transverse support beams 21 are attached between posts 20 at each end of the carriage 10. Attachment of beams 21 to posts 20 is preferably by welding but could also be effected by bolting the beams to the posts. Transverse support beams 21 are adapted to receive elongated items 24, items 24 resting upon beams 21 as shown in FIGS. 1 and 2. Beams 21 are arranged parallel to and spaced above end beams 12 creating a clearance space 23, best illustrated in FIG. 2, between the elongated items 24 and frame 16. Clearance space 23 allows use of a forklift to place a load of elongated items 24 on carriage 10 from an exposed side and then lower the forklift tines to disengage the tines from the load without contacting side beams 14 of frame 16.

Figure 4:
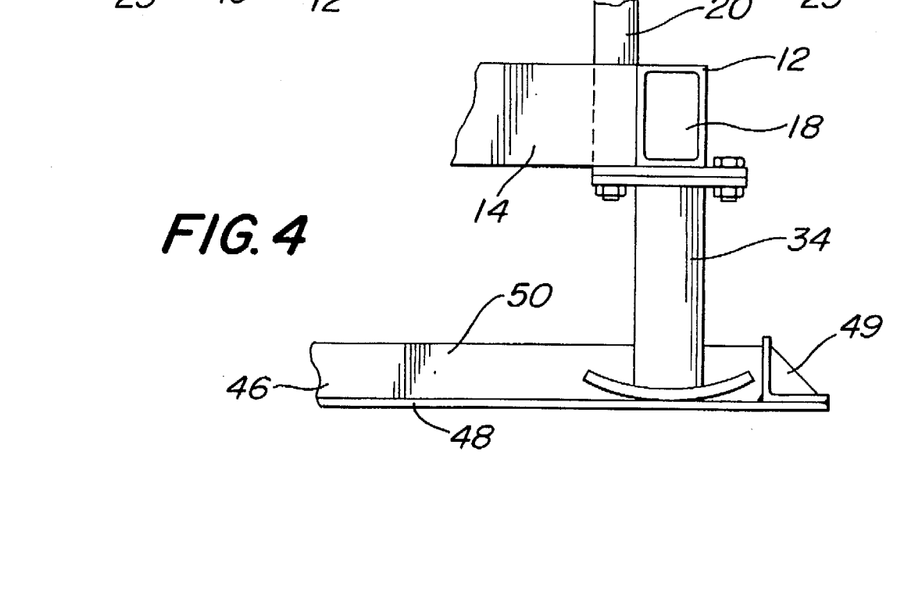
FIG. 4 is a detailed side view of a skid supporting a carriage and interengaging a guiding rail.

Frame 16 is supported at one end by a pair of wheels 32, as seen in FIG. 1. Preferably, wheels 32 are rotatably mounted in a spaced apart arrangement to provide support and mobility to the carriage. Wheels 32 are mounted inboard on frame 16 (see FIG. 2) again to allow close packed side by side placement of the carriages in a row without interference from the wheels. Alternatively, a support skid assembly 34, as seen in FIG. 4, could be attached to side beams 14 or end beams 12. Skid assembly 34 would also provide support and mobility to the carriage, although wheels 32 are preferred.

Legs 36 provide support at the opposite end of carriage 10, and although wheels could also be mounted here, it is preferable to provide simple legs attached to the side beams 14, the legs being spaced apart from wheels 32 and extending vertically downwardly from the frame 16. Legs 36 prevent carriage 10 from rolling on wheels 32 and thus serve a braking function when they rest upon a supporting surface.

Figure 3:
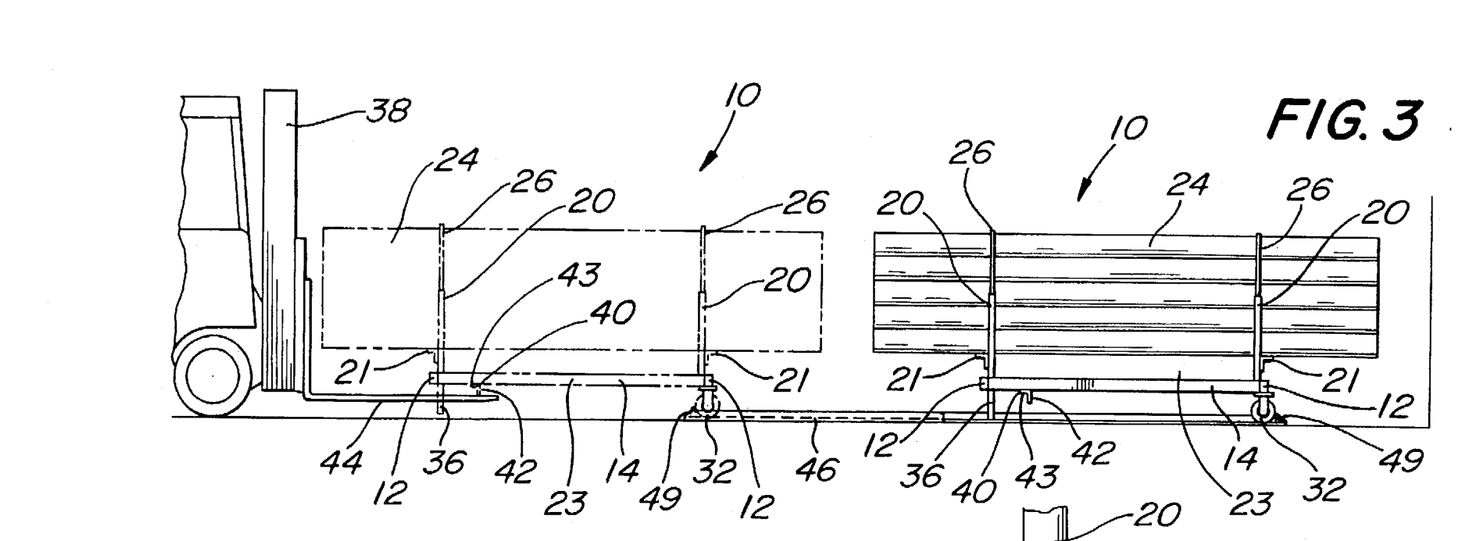
FIG. 3 is a side view of a carriage loaded with elongated items, with a second carriage shown in phantom line engaging a forklift, the forklift shown in partial view.

The preferred carriage configuration seen in FIG. 1 having wheels 32 only at one end requires that the end supported on legs 36 be elevated in order to move carriage 10. As carriage 10 is expected to be heavily loaded with elongated items 24, it is practical to use a forklift 38 or other such device to move a carriage, as illustrated in FIG. 3. A cross beam or lifting beam 40 having a downwardly extending flange 42 and a horizontally extending flange 43 is preferably mounted on the underside of frame 16 to side beams 14. Lifting beam 40 is positioned near the end of carriage 10 supported by legs 36, as seen in FIG. 3. Tines 44 of forklift 38 engage both flanges 42 and 43 of lifting beam 40 when legs 36 are elevated to move carriage 10, as illustrated in the phantom line view of carriage 10 in FIG. 3. The tips of tines 44 butt against the vertical flange 42 while also engaging horizontally extending flange 43 of lifting beam 40 to lift carriage 10. The lifting beam distributes the lifting and traction forces applied by the forklift 38 to the side beams 14 allowing the carriage to be elevated and moved without tines 44 contacting frame 16 directly. Use of lifting beam 40 also prevents contact between forklift 38 and elongated items 24 when moving carriage 10, thus minimizing the chance of damage to the items. Vertical flange 42 acts as a spacing guide or positioning flange when tines 44 butt against the flange. When tines 44 are correctly positioned to engage flange 42 and horizontally extending flange 43 forklift 38 is spaced away from the elongated items 24 as seen in FIG. 3, thus preventing damage which could occur to items 24 if forklift 38 were allowed to hit the ends of items 24 which extend outwardly from the ends of carriage 10. To most effectively serve as a spacing guide lifting beam 40 is positioned at a predetermined distance from the end of carriage 10 so as to ensure the proper spacing of forklift 38 relatively to carriage 10 and items 24 when the carriage is being moved.

Movement of carriage 10 is preferably facilitated and guided by rails 46, best shown in FIG. 1, and arranged beneath the carriage in a parallel, spaced apart relationship matched to the separation of wheels 32. Rails 46 preferably simply comprise a horizontal flange 48 attached to an upwardly projecting flange 50. Rails 46 engage the wheels 32 or skid assembly 34, as seen in FIGS. 1 and 4. Horizontal flange 48 provides a smooth surface on which the wheels or skids can roll or slide easily. This function is especially important when carriages are used on a surface, such as a gravel bed, which is not conducive to rolling or sliding movement of the carriages. Vertical flange 50 guides the motion of carriage 10 by engaging wheels 32 or skid assemblies 34 and prevents undesired lateral motion, thus confining the motion of carriage 10 to a predetermined path defined by rails 46. Each carriage 10 has its own pair of rails 46. Cross ties 49 are positioned transverse to rails 46 at each end to further strengthen the rail structure, as seen in FIG. 1. Cross ties 49 are also bolted to the ends of rails 46, and preferably comprise an elongated beam having a horizontal flange 51 and a vertical flange 53 similar to rails 46. Cross ties 49 set and maintain the lateral spacing of rails 46, and vertical flange 53 acts as a stop to prevent excess motion of carriage 10 along rails 46. As seen in FIG. 3, cross ties 49 engage wheels 32 at either end of travel of carriage 10, providing a positive stop preventing the carriage from disengaging from the rails 46 by moving too far in either direction. Guide rails 46 and cross ties 49 are structurally reinforced by a diagonal brace 47, best illustrated in FIG. 1. Brace 47 preferably comprises an elongated member which runs diagonally between the rails from one end of one rail to an opposite end of the adjacent rail. Brace 47 is preferably bolted to rails 46. Diagonal brace 47 absorbs shearing forces and helps to keep the rails from skewing under uneven loading as is well known in the art.

FIG. 8 illustrates the apparatus according to the invention comprising a plurality of carriages 10, denoted 10a–10l arranged in a closely spaced row 52. Each carriage 10a–10l carries a multiplicity of elongated items categorized according to a physical characteristic of the items, such as length or diameter. A comparison of carriage 10f with 10g provides an example of carriages having receiving means adapted for receiving items from different categories. Transverse support beams 21g which receive and support elongated items on carriage 10g are spaced further apart than transverse support beams 21f on carriage 10f in order to receive items 24g, which are longer than items 24f.

Figure 9:
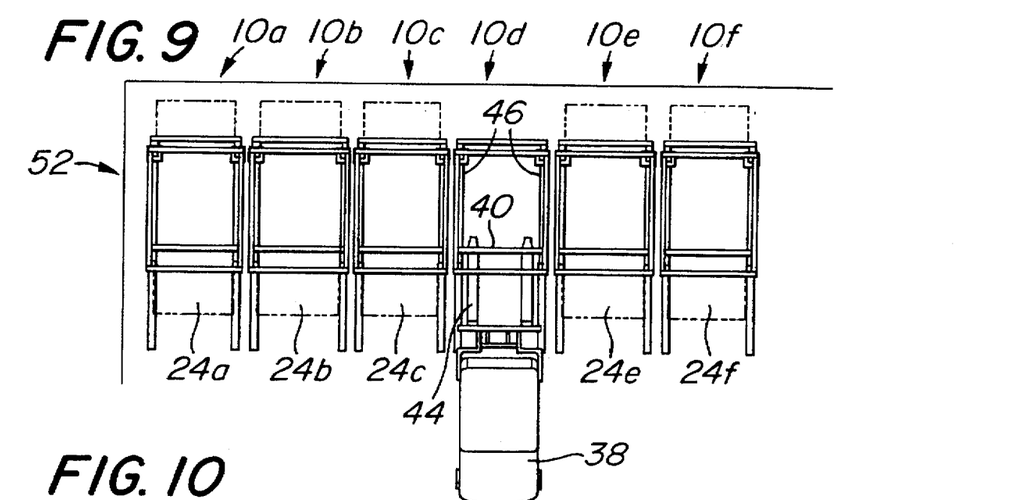
FIGS. 9–11 show a plan view depicting a series of steps defining the method according to the invention for storing, displaying and replenishing elongated items in an apparatus according to the invention.
Figures 10, 11:
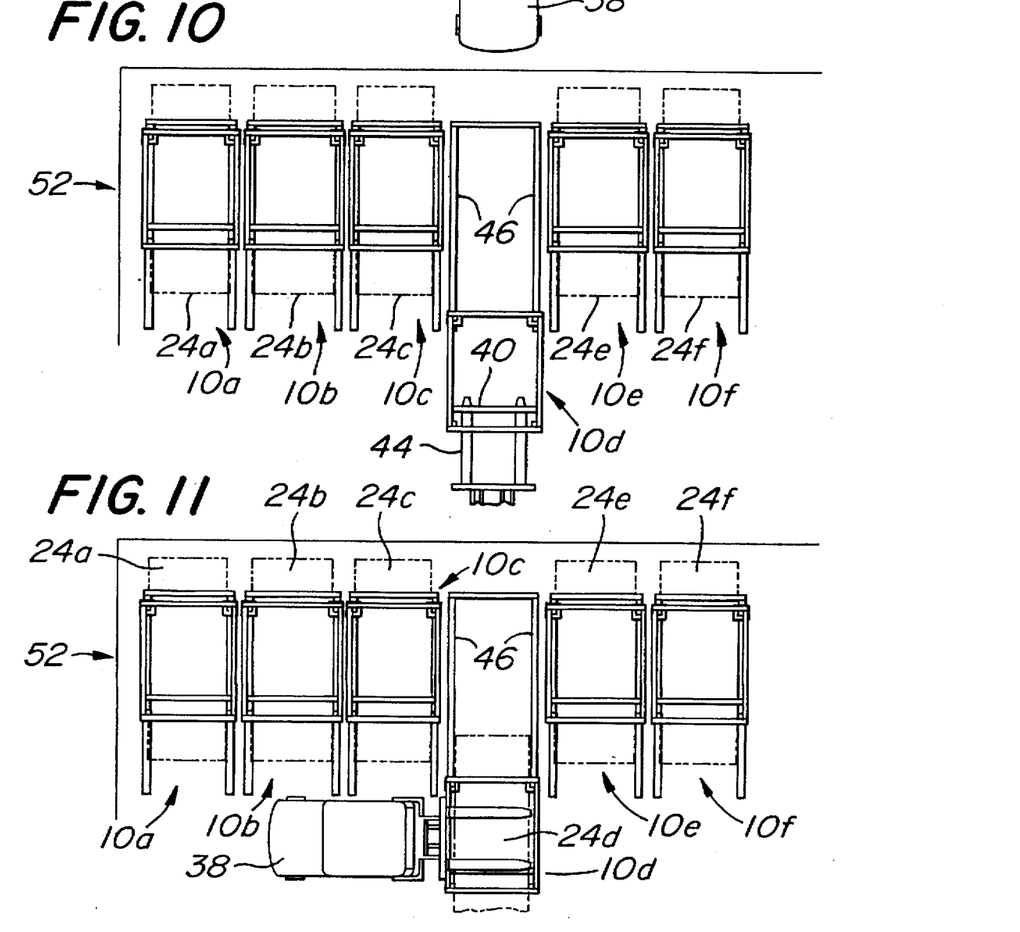

The categories are individual to each carriage, and the different category items are shown in phantom line and denoted 24a–24l, excluding 24d. Carriage 10d is empty and represents a depleted or an unloaded carriage. FIGS. 9 through 11 illustrate the method of loading or replenishing depleted or empty carriages according to the invention showing only carriages 10a through 10f from FIG. 8.

Forklift 38 approaches empty or depleted carriage 10d from the end adjacent to lifting beam 40 as seen in FIG. 9. Tines 44 engage lifting beam 40 elevating legs 36 (see FIG. 3). Forklift 38 is then driven in reverse, removing carriage 10d from row 52, wheels 32 (not shown) engaging and being guided along rails 46, until carriage 10d is clear of neighboring carriages 10c and 10e, exposing the sides of carriage 10d as seen in FIG. 10. Tines 44 are then disengaged from lifting beam 40 and the forklift goes to fetch a load of elongated items 24d having a predetermined physical characteristic appropriate to be stored and displayed on carriage 10d. Forklift 38 with its load of elongated items 24d approaches carriage 10d from an exposed side, as seen in FIG. 11, and places the elongated items 24d onto carriage 10d. Forklift 38 disengages from items 24d and again approaches carriage 10d from the end adjacent to lifting beam 40. Tines 44 engage lifting beam 40 raising legs 36 (as seen in FIG. 3) and forklift 38 is driven forward, carriage 10d being guided by rails 46 and being replaced into row 52.

The steps described above are repeated for each carriage 10 for initial loading and to replenish carriages as they become depleted. The open sided construction of the carriages allows convenient access for loading items 24 when a carriage is removed from row 52.

When all of the carriages 10 are in row 52, as shown in FIG. 8, the apparatus provides a compact and efficient means for storage and display of the elongated items 24 organized in categories individual to the carriages 10. The open end construction of the carriages permits customers or warehousemen to easily and conveniently remove individual elongated items manually from any carriage as required. The method of loading or replenishing the carriages allows one person to handle a multiplicity of bulky elongated items quickly and efficiently with little risk of damage to the items.

I claim:

1. Apparatus for storing and displaying a multiplicity of elongated items, said apparatus comprising:

a plurality of item support carriages, each carriage comprising:

a rack having first and second ends and side edges, said rack being adapted to accept and support the elongated items, the items being arranged substantially perpendicular to said ends;

a plurality of upwardly projecting spaced apart members attached to said rack along said side edges for limiting lateral motion of the elongated items supported on said rack;

a first pair of downwardly projecting supports mounted on said rack adjacent to said first end in a spaced apart relationship, said first pair of supports having movable means for providing mobility to said rack;

a second pair of downwardly projecting supports mounted on said rack spaced from said first pair along said side edges;

means for guiding movement of said rack on said first pair of supports, said guiding means interengaging said first pair of supports and being adapted to constrain the motion of said rack along a predetermined path oriented substantially perpendicular to said ends; and said plurality of carriages being arranged side edge by side edge in a closely spaced row.

2. Apparatus according to claim 1, wherein said movable means comprises a pair of rotatably mounted wheels, one wheel being mounted on each of said first pair of supports.

3. Apparatus according to claim 2, wherein said wheels are mounted inboard of said side edges.

4. Apparatus according to claim 1, wherein said movable means comprises a pair of skids, one skid being mounted on each of said first pair of supports.

5. Apparatus according to claim 1, wherein the elongated items are arranged in a plurality of different predetermined categories according to a physical characteristic of said items, each of said carriages having item receiving means being adapted for receiving items from one of said predetermined categories.

6. Apparatus according to claim 5, wherein said characteristic is item length, said one carriage having said item receiving means mounted thereon at a predetermined spaced apart distance corresponding to said item length, said one carriage being thereby adapted to receive items from said one predetermined category.

7. Apparatus according to claim 1, wherein one end of each carriage is substantially open to permit the elongated items to be selectively withdrawn from said one end.

8. Apparatus according to claim 1, wherein one side of each carriage is substantially open to permit replenishment of said carriages with the elongated items from said one side when said carriage is moved outwardly from said row.

9. Apparatus according to claim 1, wherein said first and second ends and said side edges comprise elongated tubular beams.

10. Apparatus according to claim 9, wherein said first and second ends are arranged in a parallel, spaced apart relationship, and said side edges are attached to said ends to form a rectangular frame.

11. Apparatus according to claim 10, wherein one of said plurality of upwardly projecting members is attached at each corner of said rectangular frame.

12. Apparatus according to claim 1, wherein said upwardly projecting members are attached inboard of said side edges.

13. Apparatus according to claim 1, further comprising one elongated extension segment attached to one upwardly projecting member, said segment being disposed substantially parallel to said one projecting member and projecting further upwardly therefrom to increase the length of said one projecting member.

14. Apparatus according to claim 13, wherein said upwardly projecting members are elongated tubular beams.

15. Apparatus according to claim 14, wherein said extension segment slidably interfits lengthwise within said upwardly projecting member, said segment having locking means for fixing said segment relative to said member.

16. Apparatus according to claim 15, wherein said locking means comprises a stop plate attached at a predetermined location along said segment, said stop plate impinging on said member when said segment slidably interfits within said member thereby fixing said segment relative to said member.

17. Apparatus according to claim 1, further comprising a cross beam having a lifting device engaging means for elevating said rack for movement on said first pair of supports, said cross beam being fixedly attached to said rack, said cross beam being positioned beneath said rack and being disposed parallel and adjacent to said second end.

18. Apparatus according to claim 17, wherein said lifting device engaging means comprises a downwardly extending flange projecting beneath said rack.

19. Apparatus according to claim 1, wherein said guiding means comprises a pair of guide rails disposed in a parallel, spaced apart arrangement beneath said carriage, said guide rails and said first pair of supports being movably interengagable for movement of said carriage along a predetermined path defined by said guide rails.

20. Apparatus according to claim 19, wherein each of said guide rails has a continuous flange, each said flange projecting upwardly from the guide rail and being interengagable with said first pair of supports upon withdrawal of said carriage along said predetermined path.

21. Apparatus for storing and displaying a multiplicity of elongated items organized in a plurality of differentiable categories, said apparatus comprising a plurality of item support carriages having first and second ends and sides, each carriage being adapted to receive items comprising one of said categories, each carriage comprising:

two elongated end beams arranged horizontally in a parallel, spaced apart relationship, said end beams being located at said first and second ends of said carriage respectively;

two elongated side beams rigidly connected to said end beams in a parallel, spaced apart relationship along said respective sides of said carriage, said end beams and said side beams thereby forming a rigid rectangular frame;

a plurality of posts extending perpendicularly upwardly from said frame, said plurality of posts including a pair of posts rigidly attached to each of said side beams in a spaced apart relationship, said posts being adapted to limit lateral movement of the elongated items;

two spaced apart transverse support beams mounted on said carriage, said transverse support beams being adapted to receive and support the elongated items;

two wheels rotatably attached to said frame at said first end of said carriage, said wheels being disposed on opposite sides of said carriage and providing mobility to said carriage in a direction parallel to said sides of said carriage;

two legs attached to said frame at said second end of said carriage, said legs being disposed on opposite sides of said carriage and extending vertically downwardly from said frame;

two rails disposed beneath said carriage in a parallel, spaced apart relationship matched to said wheels, said rails each having one vertically projecting flange extending continuously along the length of said rail, said flanges engaging and guiding said wheels, and thereby said carriage, along a predetermined path along said rails; and said plurality of carriages being arranged side by side in a closely spaced row.

22. Apparatus according to claim 21, wherein said transverse support beams are arranged one at each end of said carriage and attached to said posts parallel to and vertically spaced apart from said end beams.

23. Apparatus according to claim 21, wherein said differentiable category is the length of said elongated items and wherein said transverse support beams of at lest one of said carriages are spaced apart a predetermined distance inboard of the ends of the elongated items.

24. Apparatus according to claim 21, wherein said end beams and said side beams are tubular box beams.

25. Apparatus according to claim 21, wherein said posts are tubular beams.

26. Apparatus according to claim 25, wherein said posts are provide with post extenders, each extender comprising an elongated beam segment telescopically interengagable with one of said posts, one of said extenders interfitting within and projecting upwardly from each of said posts, each extender further comprising a stop plate attached at a predetermined position along the length of said extender, said stop plate impinging on said post when said extender telescopically interfits within said post, thereby positionally fixing said extender relative to said post.

27. Apparatus according to claim 21, wherein one of said posts is rigidly attached at each corner of said rectangular frame.

28. Apparatus according to claim 21, further having a lifting beam rigidly attached to said side beams adjacent to said second end, said lifting beam comprising a horizontally extending lifting flange and a downwardly extending lift mechanism positioning flange.

29. A method of storing and displaying a multiplicity of elongated items arranged in a plurality of categories, the items being distributed among a plurality of carriages arranged side by side in a row, each carriage being adapted to receive items of one category of said plurality of categories, each carriage having an open end and an open side, each carriage having means for moving along a respective predetermined path oriented perpendicularly to said row, said method comprising the steps of:

providing a pair of wheels rotatable mounted on each said carriage;

initially loading said carriages with the elongated items by:
- selecting a carriage requiring loading from said plurality of carriages;
- removing said carriage from said row to allow for side access to said carriage by moving said carriage in a first direction along said respective predetermined path;
- placing elongated items onto said carriage from said one open side, said items being placed according to a category individual to said carriage;
- replacing said carriage into said row by moving said carriage in an opposite direction along said respective predetermined path;
- continuing to remove carriages requiring loading from said row and repeating said loading and replacing steps until all carriages requiring loading are loaded;

dispensing said elongated items from said carriages by manually removing said items from each carriage from said one open end; and replenishing a depleted carriage by:
- removing said depleted carriage from said row by moving said depleted carriage in said first direction along said respective predetermined path;
- placing elongated items from one of said categories individual to said depleted carriage onto said depleted carriage from said one open side, said depleted carriage thereby becoming a full carriage; and
- replacing said full carriage into said row by moving said full carriage in said opposite direction along said respective predetermined path.

30. A method according to claim 29, wherein said steps of moving along said predetermined paths further include providing spaced apart rails beneath said carriages, said rails being positioned to constrain said movement to said paths.

31. A method according to claim 29, further including the step of elevating said open end of said carriage before said carriage is removed from said row, and maintaining said carriage in the elevated position during removal from said row.

32. A method according to claim 31, further including the step of elevating said open end of said carriage before said carriage is replaced into said row, and maintaining said carriage in the elevated position during replacement into said row.

33. A method according to claim 29, wherein said carriages are arranged in said row with each said open end adjacent to a predetermined axis arranged parallel to and in a spaced apart relationship with said row.

* * * * *